United States Patent [19]

Chudo et al.

[11] 4,266,980
[45] May 12, 1981

[54] EXPANSIVE SOLIDIFYING MATERIAL

[75] Inventors: Akira Chudo, Sakai; Tomomitsu Sugi, Ashiya; Kouji Kataoka, Osaka, all of Japan

[73] Assignee: Osaka Cement Co., Ltd., Osaka, Japan

[21] Appl. No.: 73,305

[22] Filed: Sep. 7, 1979

[30] Foreign Application Priority Data

Sep. 21, 1978 [JP] Japan .................................. 53-115134

[51] Int. Cl.$^3$ .................................................. C04B 7/02
[52] U.S. Cl. ......................................... 106/97; 106/89; 106/104; 106/109; 106/117; 106/900
[58] Field of Search ...................... 106/286.2, 97, 104, 106/900, 89, 109, 117

[56] References Cited

U.S. PATENT DOCUMENTS

| 2,947,643 | 8/1960 | Kamlet | 106/97 |
| 3,140,956 | 7/1964 | Kamlet et al. | 106/97 |
| 3,489,582 | 1/1970 | Lindgren et al. | 106/97 |
| 3,861,929 | 1/1975 | Deets et al. | 106/104 |
| 3,997,353 | 12/1976 | Chervenka et al. | 106/104 |
| 4,045,237 | 8/1977 | Gaines et al. | 106/104 |

*Primary Examiner*—Lorenzo B. Hayes
*Attorney, Agent, or Firm*—Weingarten, Maxham & Schurgin

[57] ABSTRACT

An expansive solidifying material which consists of gypsum, blast furnace slag and portland type cement as the main components and soluble aluminate as a hardening promoter. The expansive solidifying material of the invention is quite suitable for solidifying poor grounds containing much water and the solidifying material is quite excellent in the initial hardening, long term strength, water absorption, expansibility and the reduction of production cost.

2 Claims, No Drawings

EXPANSIVE SOLIDIFYING MATERIAL

BACKGROUND OF THE INVENTION (1) Field of the Invention

This invention relates to an expansive solidifying material which is used for improving the poor grounds. More particularly, the invention relates to an expansive solidifying material which contains the main components of gypsum, blast furnace slag and portland type cement and a hardening promoter of soluble aluminate.

(2) Description of the Prior Art

Generally speaking, the soils of alluvia and reclaimed lands are mainly composed of clay and silt and the water contents of the soils are large. Therefore, they are generally weak and, when such grounds are utilized, they must be stabilized by subjecting them to the improvement of soil.

In the conventional art, several kinds of lime type and portland cement type stabilizing materials have been employed for improving the properties of soils. However, various disadvantages are left unsolved, especially when the water content of the poor ground is high, a satisfactory stabilization of the ground cannot be expected.

With regard to the lime type stabilizing material, the quick lime generates heat during the use, which is undesirable in view of the safety in work. In addition, much dust is produced by the heat generation, which causes the environmental pollution to occur with a sanitary disadvantage. Further, in some cases, the slurry of milk-like solidifying material is poured into a poor ground and it is solidified by mixing with stirring. However, in such the method, any satisfactory result cannot be obtained in general cases.

Furthermore, the portland cement type stabilizing material is suitable for improving the surface soil which contains a relatively small quantity of water. However, it is not yet satisfactory for the fully poor ground.

In the case of sludge which contains difficult solidified organic materials, the hardening of the above mentioned stabilizing materials is retarded or the hardening becomes impossible. Furthermore, since the stabilizing material is generally used in a large quantity, it must be inexpensive. However, the prior art stabilizing materials are mostly expensive so that the use in a large quantity is economically disadvantageous.

BRIEF SUMMARY OF THE INVENTION

It is, therefore, the primary object of the present invention to provide an improved solidifying material which is quite free from the above-described disadvantages in the conventional art.

Another object of the present invention is to provide an expansive solidifying material which exhibits good initial hardening and long term strength to the soil to be treated.

A further object of the present invention is to provide an expansive solidifying material which is excellent in water absorption, expansibility and low heat generation.

Still a further object of the present invention is to provide an expansive solidifying material which is suitable for use in the solidifying of a very poor ground containing much water, such as difficult solidified sludge or the like.

Furthermore, an object of the present invention is to provide an expansive solidifying material which can be produced in large quantities at low cost.

In accordance with the present invention, the expansive solidifying material of the present invention consists of the main components of gypsum, blast furnace slag and portland type cement and a hardening promoter of soluble aluminate. The compounding ratios of the above main components are 15 to 40 wt.% of gypsum, 25 to 40 wt.% of blast furnace slag and 30 to 50 wt.% of portland type cement. The mixing ratio of the above soluble aluminate is 10 wt.% or less to 90 wt.% or more of the above main components. The above raw materials are pulverized and mixed together, in which the specific surface area is desirably in the range of 2500 to 4500 cm$^2$/g.

DETAILED DESCRIPTION OF THE INVENTION

In order to clarify the present invention for those skilled in the art, the details of the invention will be further described in the following.

The soluble aluminates which are used in the present invention are the materials containing soluble alumina components, impure compounds containing substantial quantities of water soluble mineral oxides of aluminum such as aluminous cement, the so-called sludge powder which is collected by bag filters in the remelting of aluminum materials through the production process of aluminum articles, burnt alunite, alumite sludge and red muddy slag occurred in the melting process of bauxite. Some exemplar compositions of them are shown in the following Table 1.

TABLE 1

| Component | Aluminous cement (%) | Dry aluminum sludge (%) | Burnt alunite (%) |
|---|---|---|---|
| Ignition loss | 0.8 | 6.0 | 1.5 |
| SiO$_2$ | 4.1 | 1.0 | 30.5 |
| Al$_2$O$_3$ | 52.3 | 78.3 | 39.7 |
| Fe$_2$O$_3$ | 1.4 | 1.0 | 2.5 |
| CaO | 38.1 | 1.6 | 0.4 |
| MgO | 0.3 | 0.8 | 0.2 |
| SO$_3$ | 0.0 | 13.7 | 18.1 |
| Na$_2$O | 0.9 | 0.48 | 3.0 |
| K$_2$O | 0.6 | 0.70 | 2.1 |

In the expansible solidifying performance of the present invention, the strength development by the hydration of Portland cement is, of course, important, however, the most characteristic feature is the fact that much of a hardly soluble hydrate of ettringite (3CaO·Al$_2$O$_3$·3CaSO$_4$·32H$_2$O) is produced in the reaction among gypsum, blast furnace slag and soluble aluminate by the alkaline stimulative action of the portland type cement.

As will be understood from the chemical formula of ettringite, much water is incorporated when it is generated and the product exhibits a large expansibility. Therefore, when the ettringite is formed in a poor ground containing much water, a large quantity of water is incorporated into the ettringite which results in expansion. Accordingly, the ettringite is quite effective to consolidate the poor ground. At the same time, the hydraulic property of the blast furnace slag is improved by the alkaline stimulative action of portland type cement, thereby exhibiting the long term strength.

Further, soluble aluminate is added as a hardening promoter. It is quite effective when the rapid hardening is required and the gound to be treated is difficult solidified.

The gypsum, blast furnace slag and portland type cement which are used in the expansive solidifying material of the present invention can be economically produced in large quantities at low prices. Especially, the chemical gypsum and the blast furnace slag from ironworks are used, the production of the expansive solidifying material becomes more economical and advantageous.

With using the above-described raw materials, the state of solidifying, expansibility and economical efficiency have been investigated by various practical experiments, as a result, the above-defined compounding ratios of raw materials have been determined.

In view of the strength obtained, it is desirable that the particle size of the expansible solidifying material of the present invention is made as small as possible. However, when the powder material is too fine, the hardening in the initial hydration proceeds to excess and the volume expansion for a long period of time cannot be expected, which is not desirable in view of the expansibility. Accordingly, it is considered from the experimental results that the degree of particle size of the powder is not smaller than about 4500 cm$^2$/g.

The expansion in water of the expansive solidifying material of the present invention is about 10 to 20 times as large as that of portland type cement.

In the following, the characteristic features and effects of the expansive solidifying materials of the present invention will be described with reference to several examples.

EXAMPLE 1

In connection with the sludge (water content: 90%) of KIZUGAWA in Osaka, Japan, comparative tests of hardening were carried out by using the expansive solidifying materials of the present invention and other solidifying materials, the results of which are shown in the following Table 3.

In the tests, 100 kg of each solidifying material was used for 1 m$^3$ of the sludge. The solidifying materials were fed into KIZUGAWA'S sludge and were mixed together by using propeller mixers for 3 minutes. Then, the mixtures were poured into polyvinyl chloride tubes of 5 cm in diameter and the tubes were sealed up. Thus prepared test samples were cured at 20° C. At each time for measuring strengths, the tubes were peeled off and the contents were cut into rods of 10 cm in length as the test pieces. (The preparation of test pieces in the following examples are the same as above).

The compounding ratios of the solidifying materials of the present invention which are symbolized in Table 3, are indicated in the following Table 2.

TABLE 2

| Solidifying material | Gypsum | Blast furnace slag | Portland cement | Soluble aluminate |
|---|---|---|---|---|
| ESC-1 | 30 | 40 | 30 | 0 |
| ESC-2 | 25 | 35 | 40 | 0 |
| ESC-1-RA₃ | 30 | 40 | 30 | 3*1 |
| ESC-1-RS₃ | 30 | 40 | 30 | 3*2 |

Notes:
*1Used aluminous cement
*2Used dry aluminum sludge

TABLE 3

| Solidifying Material | Uniaxial Compressive Strength (Kg/cm$^2$) | | | |
|---|---|---|---|---|
| | 1 Day | 3 Days | 1 Week | 4 Weeks |
| ESC-1 | 0.37 | 0.84 | 1.3 | 2.7 |
| ESC-2 | 0.39 | 0.85 | 1.5 | 3.0 |
| ESC-1-RA₃ | 0.88 | 1.5 | 3.2 | 6.4 |
| ESC-1-RS₃ | 0.96 | 1.9 | 4.4 | 8.8 |
| Ordinary portland cement | 0.19 | 0.45 | 0.82 | 1.5 |
| Portland blast furnace slag cement | 0.23 | 0.45 | 0.82 | 1.6 |
| Lime type-1 | 0.25 | 0.50 | 0.82 | 1.3 |
| Lime type-2 | 0.50 | 0.72 | 1.1 | 1.7 |
| Lime type-3 | 0.30 | 0.81 | 1.5 | 2.7 |
| Lime type-4 | x | x | x | x |
| Portland cement type-1 | 0.21 | 0.41 | 0.68 | 1.1 |
| Portland cement type-2 | 0.21 | 0.36 | 0.61 | 1.0 |
| Portland cement type-3 | 0.28 | 0.56 | 1.2 | 2.4 |

Note:
*Not hardened

It will be understood from Table 3 that the solidifying performance of the expansive solidifying materials of the present invention are superior to those of other solidifying materials.

EXAMPLE 2

In connection with the sludge (water content: 119%) of HACHIMAN bori River in Siga prefecture, Japan, the comparative tests of hardening were carried out by using the expansive solidifying materials of the present invention and other solidifying materials, the results of which are shown in the following Table 5.

The quantity of a solidifying material was 100 kg per 1 m$^3$ of each sludge.

The compounding ratios of the solidifying materials which are symbolized in Table 5 are indicated in the following Table 4.

TABLE 4

| Solidifying material | Gypsum | Blast furnace slag | Portland type cement | Soluble aluminate |
|---|---|---|---|---|
| ESC-3 | 40 | 25 | 35 | 0 |
| ESC-3-RA₃ | 40 | 25 | 35 | 3*3 |
| ESC-3-RA₅ | 40 | 25 | 35 | 5*4 |
| ESC-3-RS₃ | 40 | 25 | 35 | 3*5 |
| ESC-3-RS₄ | 40 | 25 | 35 | 4*6 |
| ESC-3-RM₅ | 40 | 25 | 35 | 5*7 |

Notes:
*3Used aluminous cement
*4Used aluminous cement
*5Used dry aluminum sludge
*6Used dry aluminum sludge
*7Used burnt alunite

TABLE 5

| Solidifying Material | Uniaxial Compressive Strength (Kg/cm$^2$) | | |
|---|---|---|---|
| | 3 Days | 1 Week | 4 Weeks |
| ESC-3 | 0.33 | 0.97 | 2.15 |
| ESC-3-RA₃ | 0.58 | 1.32 | 3.00 |
| ESC-3-RA₅ | 0.78 | 1.97 | 3.63 |
| ESC-3-RS₃ | 0.81 | 1.84 | 3.15 |
| ESC-3-RS₄ | 0.70 | 1.39 | 2.76 |
| ESC-3-RM₅ | 0.53 | 1.36 | 2.65 |
| Ordinary portland cement | 0.25 | 0.37 | 0.44 |
| Portland | | | |

TABLE 5-continued

| Solidifying | Uniaxial Compressive Strength (Kg/cm$^2$) | | |
|---|---|---|---|
| Material | 3 Days | 1 Week | 4 Weeks |
| blast furance slag cement | 0.48 | 0.71 | 1.04 |
| Lime type-1 | 0.27 | 0.74 | 1.02 |
| Cement bucillus | 0.20 | 0.45 | 1.33 |

It will be understood from Table 5 that, even though the hardening is delayed generally when the water contents are large, the addition of the hardening promoter to the expansive solidifying material of the present invention is quite effective.

Further, since the solidifying can be accelerated by increasing the quantity of the solidifying material, when the water content is very large or quick solidifying is required, the use quantity of the solidifying material may be increased. In such the case, the advantage of the expansive solidifying material of the present invention becomes notable because it is made of generally inexpensive materials.

EXAMPLE 3

The solidifying tests were carried out by using peat-containing organic soil (of Hachinohe, Aomori-Prefecture, Japan; water content: 440%; organic substance content: 42%; pH 5.00), the results of which are shown in the following Table 6.

TABLE 6

| Addition quantity of solidifying material (Kg/m$^3$) | Uniaxial Compressive Strength (Kg/cm$^2$) | | | | | | | | |
|---|---|---|---|---|---|---|---|---|---|
| | 3 Days | | | 1 Week | | | 4 Weeks | | |
| | ESC-3 | ESC-3 -RS$_3$ | Ordinary portland cement | ESC-3 | ESC-3 -RS$_3$ | Ordinary portland cement | ESC-3 | ESC-3 -RS$_3$ | Ordinary portland cement |
| 200 | 0.15 | 0.38 | 0.11 | 0.30 | 1.09 | 0.12 | 2.77 | 3.78 | 0.22 |
| 300 | 0.45 | — | — | 1.06 | — | — | 5.03 | — | — |
| 400 | 0.58 | 1.26 | 0.39 | 1.14 | 2.48 | 0.61 | 5.12 | 6.00 | 1.22 |
| 500 | 0.67 | — | — | 1.67 | — | — | 5.11 | — | — |
| 600 | 0.98 | 1.78 | 0.41 | 2.61 | 5.53 | 1.05 | 6.01 | 9.55 | 2.96 |

It will be understood from the foregoing Table 6 that the hardening of the ordinary portland cement is slow and the increase in strength is not good, while in the case of ESC-3, the strength becomes large and in the case of ESC-3-RS$_3$, the initial strength is also high.

EXAMPLE 4

The sludge (water content: 42%) of the Uchiuma pound in SHIMANE Prefecture, Japan, is a viscous soil containing much silt clay. 100 kg/m$^3$ of each solidifying material was added to the sludge and the strengths and the pH values of the extracted solution of solidified sludge-containing compositions were measured, the results of which are shown in the following Table 7.

TABLE 7

| Solidifying material | Uniaxial Compressive Strength (Kg/cm$^2$) | | pH | |
|---|---|---|---|---|
| | 1 Week | 4 Weeks | 1 Weeks | 4 Weeks |
| ESC-1 | 9.6 | 29.1 | 10.6 | 9.7 |
| ESC-1-RS$_3$ | 16.2 | 41.4 | 10.2 | 9.3 |
| Lime type-2 | 9.7 | 28.5 | 12.4 | 11.5 |
| Cement type-2 | 5.3 | 10.3 | 11.5 | 10.4 |
| Cement type-3 | 6.4 | 12.4 | 12.3 | 11.6 |
| Granular quicklime | 4.7 | 8.9 | 12.7 | 12.7 |

In the measurement of pH values, the solidified sludge was pulverized and the powder was extracted with water, and the pH was measured with regard to the extract.

The fact that the pH values of the expansive solidifying materials of the present invention are low, can be supposed from the compounding ratios of the raw materials. Further, since the solidified strength thereof is large, the dissolution of solidified sludge by water is little so that the pH is quite low as compared with the other solidifying materials. This fact is quite advantageous in view of the maintenance of environment.

EXAMPLE 5

The expansion of the expansive solidifying materials of the present invention was tested, the results of which are shown in the following Table 8.

TABLE 8

| Solidifying material | Expansion in Water ($\times 10^{-4}$) Storage Period (Weeks) | | | | |
|---|---|---|---|---|---|
| | 1 | 2 | 3 | 5 | 8 |
| ESC-2 | 34.78 | 45.67 | 53.31 | 66.10 | 82.48 |
| ESC-3 | 43.20 | 54.67 | 61.83 | 72.87 | 87.84 |
| ESC-3-A$_5$ | 76.23 | 93.41 | 104.33 | 119.40 | 141.27 |
| Ordinary portland cement | 2.76 | 3.17 | 4.33 | 4.46 | 5.51 |
| Portland blast furnace slag cement | 3.36 | 4.31 | 5.54 | 6.88 | 7.32 |

The measurement was carried out in accordance with the comparator methods of JIS(Japanese Industrial Standards) A 1129-1975 "Method of Test for Length Change of Mortar and Concrete."

In the test, silty sand was used as the sand, and the ratio of sand/solidifying material was 2% and water/solidifying material was 65%. The expansion during the curing in water was relative to the basic length just after the removal was measured. As compared with the portland type cement, the expansion of the solidifying material of the present invention is very large, therefore, the poor ground can well be solidified densely by being surrounded by normal ground and the strength of the solidified ground can be much improved.

Although the present invention has been described in connection with preferred examples thereof, many variations and modifications will now become apparent to those skilled in the art. It is preferred, therefore, that the present invention be limited not by the specific disclosure herein but only by the appended claims.

What is claimed is:

1. An expansive solidifying material comprising:
   15 to 40% by weight of gypsum;
   25 to 40% by weight of blast furnace slag;

30 to 50% by weight of Portland cement; and not more than 10% by weight of a soluble aluminate selected from the group consisting of aluminous cement, aluminum sludge obtained in the remelting of aluminum material, burnt alunite, alumite sludge and red muddy slag occurring in the melting process of bauxite.

2. The expansive solidifying material as in claim 1, wherein the specific surface area of said solidifying material is in the range of 2500 to 4500 cm$^2$/g, inclusive.

* * * * *

UNITED STATES PATENT AND TRADEMARK OFFICE
CERTIFICATE OF CORRECTION

PATENT NO. : 4,266,980
DATED : May 12, 1981
INVENTOR(S) : Akira Chudo; Tomomitsu Sugi; Kouji Kataoka It is certified that error appears in the above-identified patent and that said Letters Patent is hereby corrected as shown below:

Col. 6, line 50, after "2" delete "%"

Col. 6, line 52, after "water" delete "was".

Signed and Sealed this

Twenty-first Day of September 1982

[SEAL]

Attest:

GERALD J. MOSSINGHOFF

Attesting Officer

Commissioner of Patents and Trademarks